Oct. 19, 1948.  E. D. COLEMAN  2,451,663
BRIDGE STRUCTURE FOR pH MEASUREMENT DEVICE
Original Filed Jan. 25, 1939  2 Sheets—Sheet 1

Inventor.
Edwin D. Coleman
By
McCanna, Wintercorn & Morsbach  Attys.

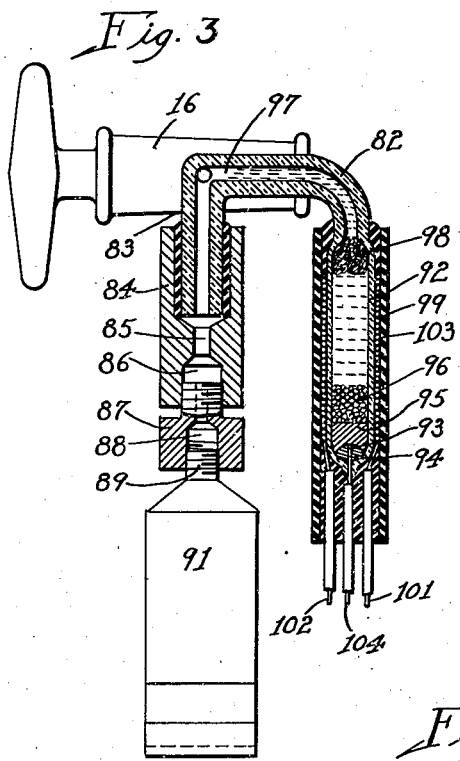
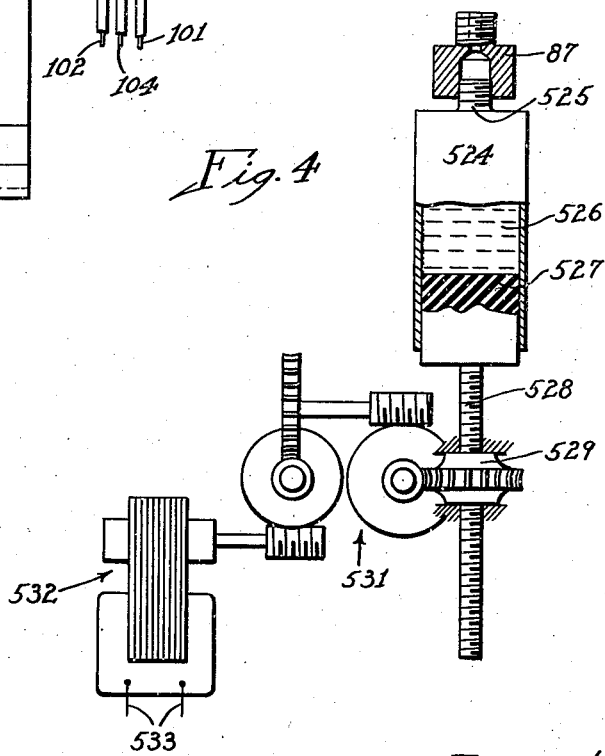

Patented Oct. 19, 1948

2,451,663

UNITED STATES PATENT OFFICE 2,451,663

BRIDGE STRUCTURE FOR pH MEASUREMENT DEVICE

Edwin D. Coleman, Maywood, Ill.

Original application February 8, 1940, Serial No. 317,805, which is a division of application Serial No. 252,779, January 25, 1939. Divided and this application July 5, 1943, Serial No. 493,559

4 Claims. (Cl. 204—195)

This invention relates to ion activity measurement and control devices, such, for example, as a hydrogen ion measurement device and parts thereof.

This is a division of my co-pending application Serial Number 317,805 filed February 8, 1940, which itself is a division of my application Serial Number 252,779 filed January 25, 1939, and now Patent Number 2,311,976.

An object of the invention is the provision of a generally improved device for electrically measuring ion activity which is reliable both for scientific and control purposes and has greater ruggedness, accuracy, and simplicity in operation than similar devices heretofore known, and the combination therewith of improved recording and control means.

An object of the invention is also to provide an ion activity measuring device having improved cell chain construction.

A further object is the provision of an ion activity measuring device having improved means for bringing the test electrode and the solution into operative relationship.

Another aim of the invention is the provision of an electric ion activity measurement device having improved means for producing and for renewing the liquid junction thereof.

I have also aimed to provide an electric ion activity measuring device having improved means for storing the junction material and improved means for dispensing the same.

A still further object of the invention is the provision of an electric ion activity measuring device having improved relationship between the bridge material and the reference electrode.

A still further object is the provision of an ion activity measuring device having improved means for automatically and continuously or intermittently renewing the liquid junction.

A further object of the invention is the provision of an ion activity measurement device having an arrangement to accommodate improved bridge material.

A still further object of the invention is the provision of a bridge material of improved composition, such as to produce improved operating characteristics in a cell chain embodying the same and arranged to facilitate the renewal of the liquid junction either by manual or by automatic means during the operation of a testing device.

Other objects and advantages will appear from the following description and the accompanying drawings, in which—

Fig. 3 is a section on the line 3—3 of Fig. 2; and

Fig. 4 is a diagrammatic showing of means for automatically renewing the liquid junction.

I have herein shown and described the invention as embodied in a device for the testing of solutions for pH, but it will be understood that many of the features thereof are not limited to the measurement of this particular property but may be applicable to the measurement and handling of other potentials of small magnitude and for analogous purposes.

Figure 1:
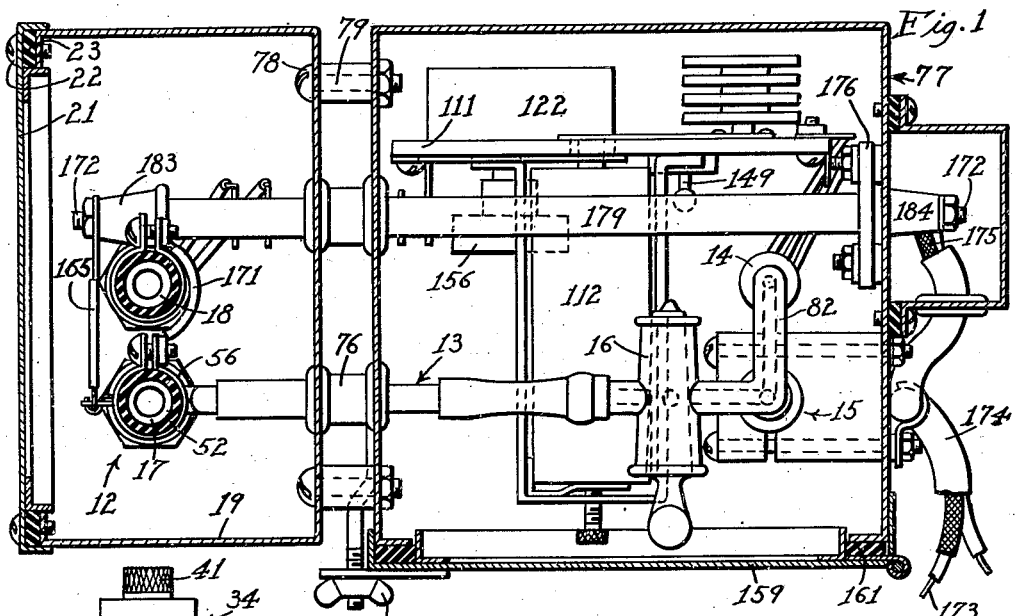
Figure 1 is a horizontal section through the cabinets housing the electrodes, salt bridge, and a part of the temperature compensation mechanism.
Figure 2:
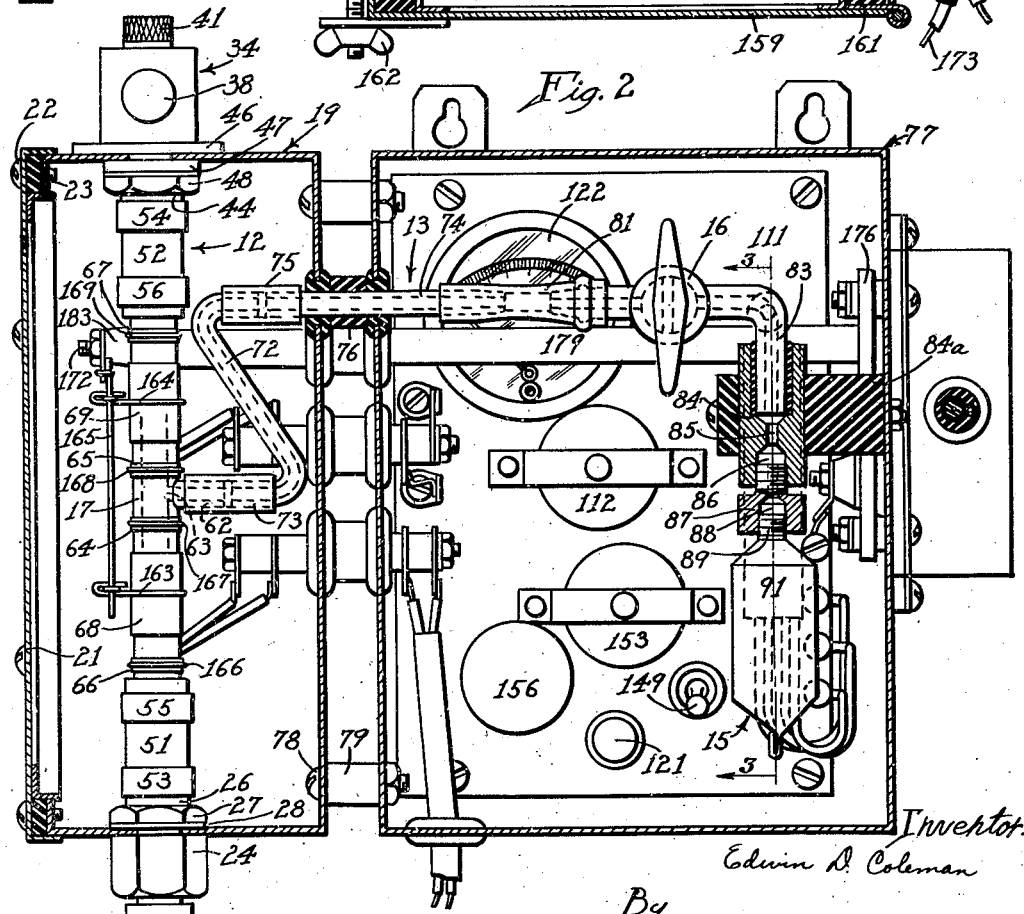
Fig. 2 is a vertical section through said cabinets.

Referring first to Figures 1 and 2, the cell chain includes a test electrode assembly designated generally by the numeral 12, a salt bridge 13, a reference electrode 14, and means for maintaining the salt bridge and renewing the liquid junction including the element 15 and the stop cock 16. The structure of the glass electrode assembly includes a glass electrode tube 17 and a temperature compensation tube 18 (Figs. 1 and 2). It will be understood by those skilled in the art that a metal electrode of suitable metal such as gold, platinum and antimony may be substituted for the glass electrode tube, in which instance the advantages of the mounting and sampling construction would still obtain. The glass electrode tube 17 and temperature compensation tube 18 are carried within a metal box designated generally by the numeral 19 having a cover 21 secured across one face thereof by means of screws 22 which compress the cover against a rubber or similar seal 23. Secured in the bottom wall of the box 19 are fittings 24, these fittings each having a hexagonal lower end and a cylindrical upper end 26 passing through openings in the box, the hexagonal lower end abutting against the outer surface of the box so as to prevent passage of air therethrough. The cylindrical upper end 26 is threaded for the reception of a nut 27 for fixing the fitting in place, a lock washer 28 being interposed between the nut and the inner wall of the box, the whole forming a practically air-tight connection and providing electrical connection between the fittings and the box. The fittings have internal bores and internally threaded counterbores for the passage of liquid through the fitting and for the reception of inlet and outlet pipes 32 and 33. A further fitting designated generally by the numeral 34, which may be either of metal or of insulation material such as synthetic resin, is positioned against the top wall of the box 19 and has a longitudinal bore extending from one end thereof to intersect a transverse bore connecting with the temperature compensation tube 18. A second transverse bore is provided adjacent the open end of the longitudinal bore, and the open ends of the bores are normally closed by screw plugs as shown at 38 and 41 threaded into the bores. The fitting 34 has nipples 44 which project through the top wall of the box 19, insulation 46 and 47 being positioned against opposite sides of the box when the fitting is of metal for the purpose of electrically insulating the fitting and the nipples from the box. The nuts 48 are threaded onto the nipples and serve to secure the fitting rigidly in position on the box. The electrode tube 17 is supported within the box between the nipple 44 and the portion 26 of the fitting 24, the ends of the tube being in spaced relation to these elements and being secured thereon by flexible rubber sleeves 51 and 52. Metal bands 53 and 54 clamp the rubber sleeves to the fittings, and clamps 55 and 56 likewise clamp the rubber sleeves to the ends of the electrode tube to provide fluid-tight connections of sufficient flexibility so that the electrode tube cannot be strained or will not be broken by sudden shocks either thermal or mechanical. The temperature tube 18 is likewise connected, as shown in my said prior patent.

Intermediate the ends of the electrode tube 17 and preferably at the mid-point therebetween is a junction tube 62 joining with the electrode tube through which the salt bridge material is passed to establish the usual liquid junction with the contents of the electrode tube, this junction being formed at the point indicated by the numeral 63. Equally spaced from the point 63 are guard rings 64 and 65 on opposite sides of the point 63 and guard rings 66 and 67 equally spaced from the guard rings 64 and 65. Interposed between the guard rings 64 and 66 and the guard rings 65 and 67 and equally spaced therefrom are contact layers 68 and 69. I have found that intimate contact between the surface of the glass tube and the metal coating forming the guard rings and contact layers is imperative for consistently good results. This contact may be secured, for example, by thermally dispersing a metal such as lead or silver over the glass surface preferably by spraying thereon.

The solution under test is circulated through the interior of the electrode tube 17, as for example, from a tank (not shown), the solution passing through the fitting 24, the electrode tube 17, the nipple 44, the fitting 34, the temperature compensation tube 18, and thence back to the tank or to some other point of disposal as circumstances may require.

In order to reduce the effects of current through the electrode tube, I have found it desirable to make liquid junction with the liquid in electrode tube 17 at the point 63 and to symmetrically space the contact layers 68 and 69 with respect to the liquid junction at 63 whereby the effect of the transverse current on one of these contact layers is substantially compensated by the effect of the current on the other thereof. In other words, if the drop in potential between the liquid junction 63 and the electrode layer 68 is positive, the drop between the liquid junction 63 and the electrode layer 69 will be negative and very nearly of the same magnitude.

Liquid junction with the sample within electrode tube 17 is established at the point 63 by means of a column of conducting material, preferably a semi-plastic material such as agar gel. In this instance, this column of conductive material includes the tube 62 connected to a tube 72 by means of a rubber sleeve 73 which is in turn connected to a tube 74 by means of a rubber sleeve 75, the tube 74 extending through a rubber grommet 76 positioned in the back wall of the box 19 and in the side wall of a metal housing 77, the metal housing 77 being attached to the box 19 by means of screws 78 and spacers 79. The tube 74 is connected to the stop cock 16 by means of a rubber sleeve 81 which is connected to the source of bridge material 15 and to the reference electrode 14 by means of tubes 82 and 83, this system of tubes forming the conductive column or salt bridge 13. The salt bridge tube 13 is substantially filled with the bridge material which constitutes an electrical conductor between the liquid junction at 63 and the reference electrode 14. The stop cock 16 is normally closed, but a layer of bridge material is inevitably produced about the bore of the stop cock in response to the turning of the cock, and maintains electrical communication through the cock. The free end of the tube 83 carries a fitting 84 supported in an insulating block 84a and having a bore 85 communicating with the interior of the tube 83, and a threaded counterbore 86 threaded to receive an adapter 87 which is also provided with a bore 88 adapted to receive the threaded dispensing end 89 of a conventional collapsible tube 91. The bridge material is carried in the tube 91 and is dispensed through the bore of the adapter 87 and the bore of the fitting 84 into the tube 83. This arrangement is of considerable merit because of the difficulty of attaching the collapsible tube 91. I have found that because of the nature of the threads on the dispensing end 81 of tubes of this character, which are commonly made of soft metal such as lead, extreme difficulty is encountered in threading the tube into position. I have therefore provided the adapter 87 which is screwed onto the end of the tube prior to attachment into the fitting 84 and the adaptor is subsequently screwed into the counterbore 86, thus permitting the adapter to be supplied to the tube in the open where greater care and accuracy can be obtained in the fitting of the parts.

The bridge material is exposed to the sample in the electrode tube 17 at the point 63, and as this surface continues to be so exposed, the concentration of KCl or other salt contained in the bridge material is gradually reduced until eventually appreciable error would be devoloped at 63 unless means were provided for replacing this surface with a fresh surface of bridge material sufficiently rich in KCl. This is accomplished by opening the cock 16 and then compressing the tube 91, thereby forcing bridge material from the tube into the salt bridge tube 13, discharging an equivalent amount of the exhausted bridge material at the point 63 from whence the exhausted material is rejected from the electrode tube with the flow of sample therethrough. The cock 16 is closed during normal operation so that in the event of excessive fluid pressure in the electrode tube, this excessive pressure cannot be relieved by driving the bridge material back into the collapsible tube 91 or into the reference electrode 14.

The reference electrode is formed directly on the end of the tube 82 (see Fig. 3) and consists of an elongated glass bulb 92 having sealed in the bottom thereof a platinum or other suitable electrode 93 immersed in mercury 94 covered in turn with a layer 95 comprising a mixture of calomel and KCl. Positioned thereabove is a solution 96 consisting of saturated KCl solution which fills the bulb and extends through the bore of the tube 82 to approximately the point 97 where contact is made with the bridge material. At the point where the bulb joins the tube 82 a small piece of glass wool 98 is fused into the wall of the electrode bulb to prevent the mercury from flowing into the tube 82, thus escaping from the bulb. The glass wool further functions to prevent granules of the bridge material from passing through the tube 82 and falling into the electrode proper. This assembly constitutes a novel type of saturated calomel half cell, but it will be understood that my invention is not limited to any particular form of half cell, but also contemplates in certain phases the use of half cells of other types, such as the unsaturated calomel half cell or other half cells well known in the art, or similar devices for producing substantially constant potential between a metallic conductor and a fluid. It will be seen that I have not only provided a novel form of reference electrode, but in addition, novel means for re-making the liquid junction, and this, in combination with the use of a sealed reference electrode, constitutes a highly improved and simple procedure for replacing the liquid junction without danger of contaminating the reference electrode and with a minimum of difficulty, time and effort. I have also provided novel means for storing a reserve supply of bridge material, and novel means for replacing the supply.

In order to effect compensation for variation in temperature of the reference electrode, the reference electrode is surrounded with a resistance coil 99 (Fig. 3) having leads 101 and 102, and over the entire assembly is mounted a protective sheath 103, the resistance coil 99 being temperature sensitive. A lead 104 connects to the platinum terminal 93 of the reference electrode and constitutes one terminal of the cell chain consisting of the reference electrode and the glass electrode.

Disposed within the box 77 are portions of the temperature compensation device including a meter 122, batteries 112 and 153, a polarity reversing switch 149, a switch 121, and a voltage divider operated by a knob 156, these parts being assembled on a mounting plate 111, as described in my said patent. The electrode tube 17 and the temperature tube 18, together with their directly associated parts, are assembled within the box 19. It will be realized that the sample being circulated through the electrode tube and temperature tube may be at temperatures substantially different from room temperature, and since the temperature of the sample may vary to a considerable extent, I have found it desirable to thermally isolate the reference electrode from the region in which the temperature of the sample may exert any material effect. This is accomplished by mounting the electrode tube and the temperature tube within the box 19 and by providing the cover 21 and the gasket 23 to substantially hermetically seal the box. Furthermore, space is provided within the box for the reception of an open container of a desiccant such as fused calcium chloride, hydrous calcium sulphide, sulphuric acid, or other desiccant to substantially free the air within the chamber from moisture. This is of particular importance where cold solutions are being passed through the electrode tube since otherwise condensation of moisture occurs on the outside of the glass electrode that may seriously interfere with the operation of the instrument because of short circuits between the various parts thereof. Furthermore, the arrangement is such that all adjustments and the cleaning of the electrodes is possible without entering the box 19. The electrical conductors and the salt bridge are brought through the box through rubber grommets which serve to seal the openings thereabout and prevent infiltration of moisture. The housing 77 is provided with a door, as indicated at 159 (Fig. 1) provided with a gasket 161 and secured in place by a wing nut 162 which may be opened to allow immediate access to the interior thereof for making adjustments in the electrical circuit as heretofore indicated.

In order to conduct the current from the glass electrode tube to the measuring instrument, wire loops 163 and 164 extend around and in intimate contact with the contact layers 68 and 69 and are engaged by a conductor 165 (Fig. 2). Wire loops 166, 167, 168 and 169 likewise engage the guard rings 64, 65, 66 and 67 and are interconnected by a conductor 171. The conductors 165 and 171 are connected to a metal rod 172 and to a metal tube, respectively, insulated therefrom, the rod and tube being enclosed in an insulating sleeve 179 as more fully described in my said patent, which extends from the interior of the box 19 through the housing 77 as shown in Fig. 1, the opposite end of rod 172 being connected to a lead 173 from which circuit is completed to the measuring instrument through a cable 174, the lead 173 having a shield 175, so designed that the potential of the shield 175 is at the same potential as the lead 173 when the potentiometer of the measuring circuit balances that of the cell. The shield 175 is connected to the opposite end of the tube and thus to conductor 171 and to the guard rings, these elements forming part of the so-called McClure circuit described in my aforesaid patent. Ceramic insulators 183 and 184 are in contact only with the conductor 171 or with regions at the same potential as the conductor 173 and the shield 175, and therefore, no leakage can occur from the ceramic insulators due to surface leakage when the cell changes potential balance because where exists no difference of potential between the conductor 171 or the lead 173 and the adjacent portions of the McClure circuit including the elements 182 and 176. It is thus possible to connect the glass electrode to the measuring device through the shield 175 without in any way disturbing the potential of the glass electrode lead including the conductor 165, the rod 172 and the lead 173 by stray electrical leakage, and it is further possible to extend the cable 174 for distances of several hundred feet, since a cable of this construction cannot leak to the conductor 173 when used in the electrical circuits herein described.

The purpose of the guard rings 64 to 67, inclusive, is to prevent electrical leakage along the surface of the glass tube. These four guard rings are connected together and to the McClure circuit, and hence, since the potential of this circuit is the same as that of the contact layers 68 and 69 of the glass electrode at the point of balance, there can occur no leakage from the contact layers along the surface of the glass tube.

In Fig. 4 I have shown means for automatically replacing the liquid junction at 63 (Fig. 2). This device includes a cylinder 524 having a threaded outlet end 525 somewhat similar in nature to the threaded outlet 89 of tube 91 (Fig. 3) adapted to be threaded into the member 87 in place of the collapsible metal tube 91 of Fig. 3 and adapted to hold a supply of bridge material indicated at 526. A plunger 527 is positioned in the cylinder 524 and has a threaded stem 528 upon which is positioned a worm wheel 529 secured against lateral movement and rotated by means of a reduction gear train indicated generally by the numeral 531 and driven by a motor 532 connected to a source of power by leads 533. If desired, switch contacts may be interposed in this power supply for the purpose of intermittently actuating the motor and feeding the bridge material to the liquid junction in a step-by-step fashion. As shown, the mechanism continuously feeds bridge material, the gear train 531 being such as to very slowly advance the plunger 527 and continuously replace the bridge material.

While any suitable form of bridge material may be employed, I have found it particularly desirable to employ a novel type of bridge material in the form of a plastic composition incapable of flowing under its own hydrostatic pressure. A suitable material is formed by heating together one hundred grams of water, two grams of agar over a steam bath until the mixture is clear. Thereupon about thirty grams of potassium chloride is dissolved therein and the mass allowed to cool and remain quiescent until a gel is well established. The gel mass is then forced through a mesh screen to rupture the gel and render the mass plastic. This latter step breaks up the gel into small particles rendering the same sufficiently plastic to flow under moderate pressure. I have found, however, that a preferred type of composition results from the use in the combination of a plasticizer such as glycerol, ethylene glycol, diethylene glycol, or sulfonated castor oil. This is desirable since it avoids the difficulty heretofore associated with the use of bridge materials in their tendency to seep out and dry around the edges of a stop cock or at the junction of tubes. When such a plasticizer is used the gel remains permanently plastic and the above mentioned difficulties are not encountered. This preferred type of composition can be made as follows: About 30 grams of agar and 180 cc. of water are heated over a water bath until clear. About 2 grams of methyl cellulose is then added to the solution near its boiling point and allowed to cool with stirring until the cellulose peptizes and the solution becomes smooth and free of lumps. About 20 cc. of glycerine are then added and the mass re-heated, whereupon about 60 grams of potassium chloride and about 100 grams of barium sulphate are added and the mass stirred until the chloride is dissolved and the sulphate is well dispersed. Material is then cooled and well stirred just before the setting temperature is reached. The material is then allowed to stand to produce a gel and when gelled, is forced through a mesh screen having a mesh size in accordance with the degree of plasticity required, approximately thirty mesh screen being satisfactory for use in the apparatus herein disclosed.

Where in the specification and claims a plastic or a plastic mass is referred to, the terms are used in their commonly accepted sense in the science of rheology, and refer to a mass which acts as a rigid body when an increasing force is applied thereto until the force increases to a critical point at which the mass yields and flows as a fluid. That is, there must be an initial increment of pressure which does not cause flow as distinguished from a fluid which yields and flows under any applied stress and a gel in which the force causes elastic deformation only and which does not flow.

While I have thus described and illustrated specific embodiments of the invention it will be understood that this is by way of illustration and not limitation.

I claim:

1. In a device for measuring ion activity, an electrode comprising a tube having a bore through which the sample is passed for test purposes, a bridge tube connecting with said bore intermediate its ends, a supply of plastic bridge material incapable of flow through said bridge tube under its own hydrostatic pressure but capable of easy flow through said tube under moderate pressure, and means for forcing bridge material through said bridge tube to establish liquid junction with said sample at the junction of said tubes.

2. The combination in a cell chain having a test electrode and a sample, of a salt bridge, comprising a bridge tube communicating with said sample, a plastic bridge material filling said tube, incapable of flowing therethrough under its own hydrostatic pressure, means for holding a reserve supply of bridge material comprising a collapsible metal tube, and means for connecting said metal tube to said bridge tube comprising a fitting having threaded engagement with said metal tube and with said bridge tube.

3. In a device for measuring ion activity, an electrode comprising a tube having a bore for the continuous passage of a sample for test purposes, a bridge tube connecting with said electrode, a reserve supply of gelatinous bridge material capable of flow through said tube under moderate mechanically applied pressure, and means for holding said reserve supply and for forcing the bridge material through said bridge tube to establish liquid junction with said sample comprising a collapsible metal tube filled with bridge material, and means connecting said collapsible metal tube to said bridge tube.

4. In an electrolytic cell chain, the combination of a test electrode for holding a test sample, a half cell having a single opening therein, a salt bridge comprising a tube connecting said opening to said electrode, a tube joining said bridge tube between the half cell and the electrode, and a supply of bridge material in said tubes, a reserve supply of bridge material connected to the last mentioned tube, said bridge material being in the form of a mechanically ruptured conductive gel medium of substantially uniform viscosity, and means for mechanically forcing said bridge material from said reserve supply through said bridge tube in successive increments to renew the liquid junction.

EDWIN D. COLEMAN.

REFERENCES CITED

The following references are of record in the file of this patent:

UNITED STATES PATENTS

| Number | Name | Date |
|---|---|---|
| 1,262,808 | Keyt | Apr. 16, 1918 |
| 1,727,094 | Bayliss | Sept. 3, 1929 |
| 2,046,101 | York | June 30, 1936 |

(Other references on following page)

| Number | Name | Date |
|---|---|---|
| 2,061,592 | Rapids | Nov. 24, 1936 |
| 2,085,129 | Stoewener | June 29, 1937 |
| 2,128,917 | Crocker | Sept. 6, 1938 |
| 2,161,186 | Morgan et al. | June 6, 1939 |
| 2,168,867 | George | Aug. 8, 1939 |
| 2,183,531 | Allison | Dec. 19, 1939 |
| 2,280,600 | Muller et al. | Apr. 21, 1942 |

FOREIGN PATENTS

| Number | Country | Date |
|---|---|---|
| 768,578 | France | May 22, 1934 |

OTHER REFERENCES

"Transactions of the Electrochemical Society," vol. 71, pages 78, 79; vol. 74, pages 571, 572.

"Journal of the American Chemical Society," vol. 52, pages 1331, 1332; vol. 57, pages 2139 through 2144.

"Journal of Biological Chemistry," vol. 88, pages 609, 610, 611.

"Journal of Scientific Instruments," vol. 3, pages 404 through 409.

"Journal of the American Leather Chemists Association," vol. 31, pages 32, 33, 34.